April 4, 1950     A. T. NABSTEDT ET AL     2,502,798
FLUID PRESSURE OPERATED CLUTCH Filed March 15, 1947     5 Sheets-Sheet 1

Inventors
Arthur T. Nabstedt
John O. Berndtson
By Rockwell & Bartholow
Attorneys Inventors
Arthur T. Nabstedt
John Q. Berndtson
By Rockwell & Bartholow
Attorneys April 4, 1950     A. T. NABSTEDT ET AL     2,502,798
FLUID PRESSURE OPERATED CLUTCH Filed March 15, 1947     3 Sheets-Sheet 3

April 4, 1950 — A. T. NABSTEDT ET AL — 2,502,798
FLUID PRESSURE OPERATED CLUTCH
Filed March 15, 1947 — 5 Sheets-Sheet 4

Inventors
Arthur T. Nabstedt
John O. Berndtson
By Rockwell & Bartholow
Attorneys April 4, 1950   A. T. NABSTEDT ET AL   2,502,798
FLUID PRESSURE OPERATED CLUTCH
Filed March 15, 1947   5 Sheets-Sheet 5

Inventors
Arthur T. Nabstedt
John O. Berndtson
By Rockwell & Bartholow
Attorneys Patented Apr. 4, 1950

2,502,798

UNITED STATES PATENT OFFICE 2,502,798

FLUID PRESSURE OPERATED CLUTCH

Arthur T. Nabstedt, Hamden, and John O. Berndtson, Short Beach, Conn., assignors to The Snow-Nabstedt Gear Corporation, New Haven, Conn., a corporation of Connecticut Application March 15, 1947, Serial No. 734,973

17 Claims. (Cl. 192—91)

This invention relates to clutch mechanism which can be used very advantageously in connection with marine reverse gears, although not limited to that application.

One of the objects is to provide a friction clutch involving a minimum number of parts and of relatively light structure, which is nevertheless very rugged and capable of transmitting a relatively large amount of power.

Another object is to provide a friction clutch that takes hold in a gradual manner so as to operate very smoothly.

Another object is to provide an improved friction clutch, operable by fluid pressure, that is especially well adapted for use in a marine reversing gear.

Another object is to provide an improved actuating device for a friction clutch, and an improved friction clutch structure.

Figure 1:
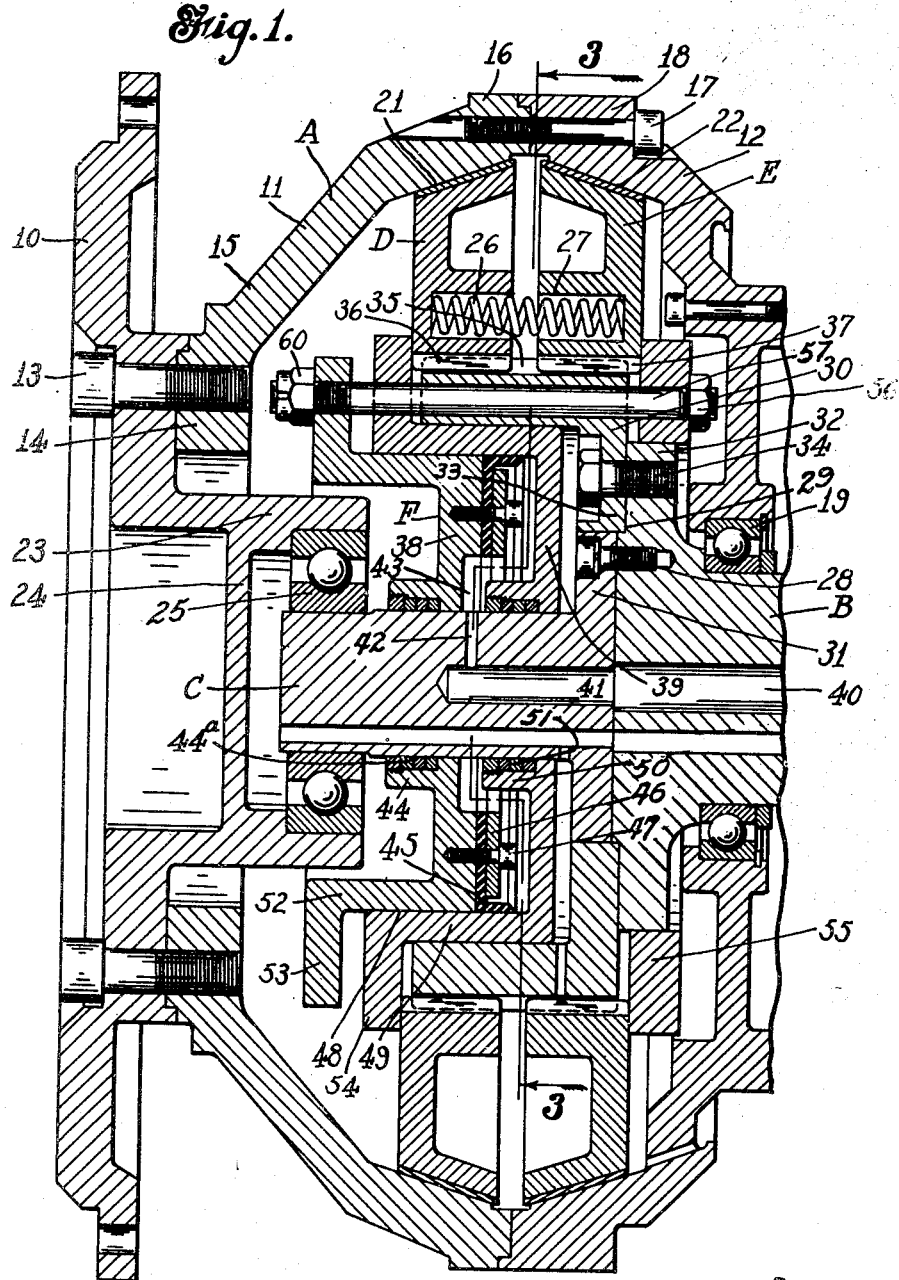
Fig. 1 is a vertical central section through the forward portion of a reversing gear, showing a clutch mechanism embodying the invention, the clutch being in the engaged position.

In Fig. 1 of the drawings, there is shown a form of clutch mechanism embodying the invention, this clutch mechanism being of a form and arrangement particularly useful in marine reversing gears, and a portion of such a reversing gear is disclosed, in which there is a member that is intended to be driven from the marine engine, a shaft having a forward end and a rear end and capable of driving a propeller or other take-off from its rear end, and a fluid-pressure-actuated friction clutch adapted to interconnect the engine-driven member with the forward end portion of the shaft. The engine-driven member is generally in the form of a cup having a peripheral portion that is hollow and provided interiorly with oppositely inclined friction surfaces, these surfaces being adapted to cooperate with friction surfaces provided upon an inner clutch member comprising axially movable sections drivingly connected with a suitable member located at the forward end portion of the shaft, and these clutch sections in this form are normally separated by springs which hold them in the engaged position, said sections being moved toward each other by a fluid-pressure device, as hereinafter described, for the purpose of disengaging the clutch. The fluid-pressure device is associated with the forward end portion of the shaft and located radially inwardly with respect to the friction-clutch surfaces, and the pressure fluid is supplied to this device from a passage extending longitudinally in the shaft. The fluid-pressure device can be placed in and disconnected from communication with the fluid-pressure source by the use of a controlling valve placed in the supply connection.

In the drawings, the engine-driven member is indicated generally at A, the rotary shaft at B, the latter shaft having the forward extension C. The sections of the inner clutch member are indicated at D and E, and the fluid-pressure device for actuating the friction clutch is indicated generally at F.

The engine-driven member A is preferably made in sections, as shown, the same having a forward section 10 of generally disk-shaped form, adapted to be connected to the engine in any suitable manner; an intermediate section 11 forming part of a hollow cup-shaped structure; and a rear section 12 extending inwardly toward the shaft and having an enclosing relation with respect to the friction clutch, and having a suitable bearing upon the shaft. The section 10 in the form here shown is generally disk-like and is secured to section 11 by means such as bolts 13. Section 11 has an inwardly extending wall 14 at the forward part, and it also has a rearwardly and outwardly inclined portion 15 leading to a flange-like part 16 that is connected by means such as bolts 17 to a complemental flange-like part 18 on the section 12. The section 12 at its peripheral portion extends rearwardly, and the wall of this section 12 then extends generally inwardly or transversely, said section having an inner edge supported on the shaft B by the anti-friction bearing 19. The peripheral portions of the mating sections 11 and 12 have formed upon them oppositely inclined friction surfaces 21 and 22, creating between them a rather large or obtuse angle, and these friction surfaces cooperate with correspondingly shaped friction surfaces on the sections D and E, the latter friction surfaces being provided upon suitable facing material with which the sections are equipped.

The disk-like section 10 is provided at the central part with a portion 23 in the shape of a hub into which the shaft extension C is extended, said hub-like portion being hollow and provided with a transverse wall 24 that creates a cup-shaped recess accommodating an anti-friction bearing 25, the outer race of which engages the portion 23 and the inner race of which is engaged with the extremity of the shaft extension.

The inner clutch sections D and E are acted upon by helical springs 26 placed between them and received in suitable sockets 27, said springs tending to separate these clutch sections and to hold them in firm engagement with the friction surfaces of the outer clutch member. These sections D and E are ring-like parts that are preferably chambered interiorly for cooling purposes. These parts are mounted from the shaft, as hereinafter described, in a manner to be freely slidable in an axial direction with respect to each other and the shaft within certain limits while remaining in driving relationship to the shaft, the arrangement being such that when it is desired to release the clutch the fluid-pressure device F can be brought into action for moving these parts or elements toward each other. For mounting them, the shaft B has the forward separate section C attached to the main shaft portion by means such as bolts 28, the two sections of the shaft providing between them an annular seat 29 receiving a ring-like member 30 which serves to guide the sections or parts D and E in their axial movements. As will be seen from Fig. 1, the rear end of the shaft extension C is provided with a flange 31, which is connected to the forward end of the main shaft section by the bolts 28, and the forward end of the main shaft section is provided with a flange 32, the flanges 31 and 32 providing in conjunction the recess or seat 29 in which is received a flange 33 formed integrally upon the member 30. The flange 33 is held in this recess by means such as bolts 34. The flange 33 projects radially inwardly from the rear end of the ring member 30. The radially outer surface of ring member 30 is provided with a plurality of splines 35 engaged with corresponding splines 36 and 37 formed upon the radially inner faces of the inner clutch parts or sections.

The fluid-pressure device F is constructed and arranged in such a manner that, when the pressure medium is introduced into a pressure chamber provided between two axially movable pressure members or pistons of the device, the rear movable clutch element E will be moved in a forward direction, and the forwardly located element D moved in a rearward direction, for the purpose of releasing the clutch. With this in view, the construction and arrangement of the fluid-pressure device are preferably as follows: Sufficient space is left between the anti-friction bearing 25 and the flange at the rear end of the shaft extension to accommodate oppositely moving pressure members 38 and 39 disposed about the forward shaft section and having packing devices or seals contacting said section at its periphery. The main shaft section is provided with an axial supply passage 40 in communication with a short axial supply passage 41 in shaft section C, and near the forward closed end of passage 41 a lateral passage 42 leads to the exterior of the shaft structure and into an annular expansible fluid space 43 between the members 38 and 39. The pressure member 38 has a forwardly directed inner sleeve portion 44 provided with suitable packing material 44ª held in contact with the shaft surface. The member 38 has a transverse wall portion provided interiorly with packing 45 held in place by a plate or plates 46 and screws 47. The packing 45 has a free edge engaged with a cylindrical surface 48 provided upon a cylindrical wall portion 49 of the pressure member 39. The pressure member 39 is provided at its radially inner part with a sleeve portion 50 extending forwardly therefrom and provided with packing material 51, and the member 39 has a transverse wall parallel to the transverse wall of member 38, the first-mentioned transverse wall being integral with the cylindrical wall portion 49. The pressure member 38 is also provided with an outer cylindrical wall portion, the same being indicated at 52, and the same extending in a forward direction from the pressure member so as to be within and in contact with the cylindrical wall portion of the other pressure member, the arrangement being such that the pressure members telescope, with a pressure chamber provided therebetween, and with the packing 45 preventing any escape of fluid between the radially outward portions of the members where they make contact with each other, and each pressure member being free to slide axially with respect to the other pressure member.

The members 38 and 39 are provided at their forward ends with flanges 53 and 54, respectively, disposed in transverse planes, the flange 54 being disposed forwardly of the clutch section D, and being adapted to make contact with said section at the radially inward part of the latter. The cylindrical wall portion of member 39 is disposed immediately inwardly of the splined member 30, previously described, said splined member having a smooth inner cylindrical surface which aids in guiding the pressure member 39. While the flange 54 is adapted to shift clutch section D in one direction, a shift of clutch section E in the opposite direction is effected by a ring member 55 adapted to make contact with section E at the radially inner part thereof, ring member 55 being engaged at its rear face by nuts 56 screwed upon the rear ends of rods 57, which rods are freely movable in perforations 58 provided in ring member 55. The rods 57 are located in a number of circumferential locations with respect to the pressure member 38, and pass through perforations 59 in the flange 53, and nuts 60 are screwed on the rods forwardly of the flange 53. The rods 57 also pass through perforations 61 in the flange 54 and through suitable bores 62 provided in the splined member 30.

Figure 8:
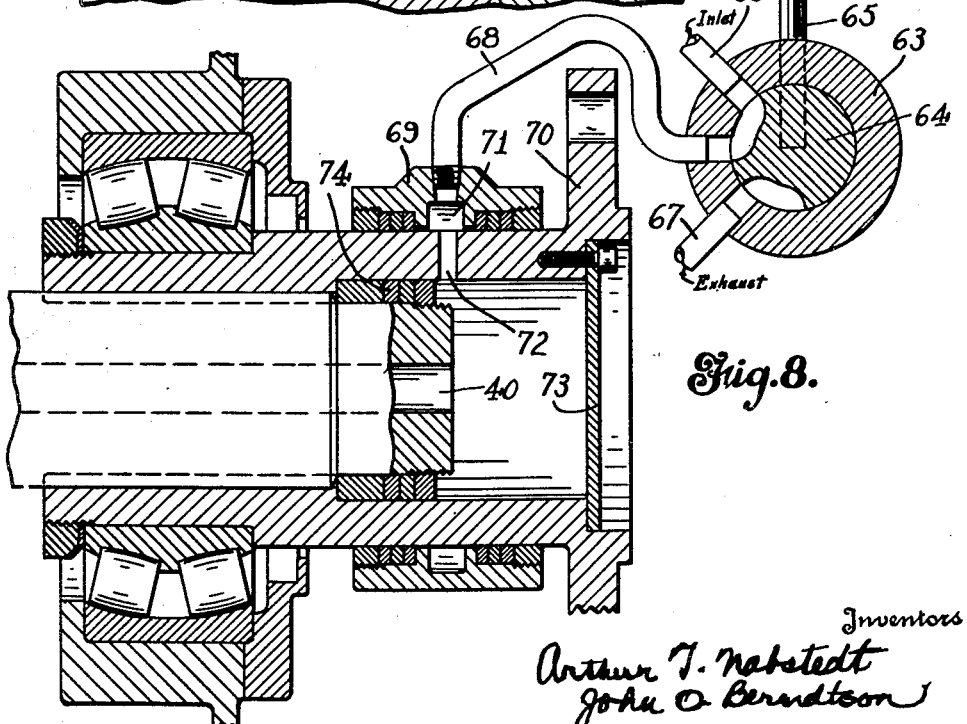
Fig. 8 is a sectional view showing a fluid-supply arrangement by means of which fluid can be introduced into the supply passage in the clutch shaft.

The passage 40 in the shaft B may be supplied with fluid, for example air or oil, from the rear end of the shaft, and in Fig. 8 we have illustrated by way of example one arrangement whereby the pressure fluid is carried from a fixed supply pipe to the passage in the shaft. Other arrangements may, however, be provided as conditions may require. In Fig. 8 the passage formed centrally in the rear end of the shaft may be assumed to be the rear end of the passage 40 of Fig. 1. In Fig. 8 a rotary controlling valve 63 is shown diagrammatically by way of example, said valve having a rotatable body 64 adapted to be turned by a handle 65. The casing of the valve is connected at one point to an inlet pipe 66 connected to a suitable source of fluid pressure, which source is not shown in the drawings. The valve casing also has connected to it an exhaust pipe 67, and a pipe or tube 68 which is adapted to supply fluid to a fixed interiorly grooved ring 69 surrounding a cylindrical portion of a coupling member 70 keyed to the rear end portion of the shaft. The fixed ring 69 is provided with suitable packing in contact with the external surface of the coupling member, and a groove 71 provided interiorly in ring 69 is in communication with a port 72 in the side wall of the coupling member, port 72 being in communication with the passage 40 by way of a chamber provided within the coupling member. The chamber referred to is provided in part by a cover 73 applied to the rear open end of the coupling member. Suitable packing material 74 is provided between the rear end portion of the shaft and the inner surface of the coupling member, so that there can be no leakage between the shaft and the coupling member in a forward direction.

Supposing that the pressure fluid is oil, for example, a valve such as diagrammatically shown will in one position supply fluid to the pressure device for actuating the clutch, and in another position will enable the oil to be cut off from the source and vented by way of the exhaust pipe.

Figure 2:
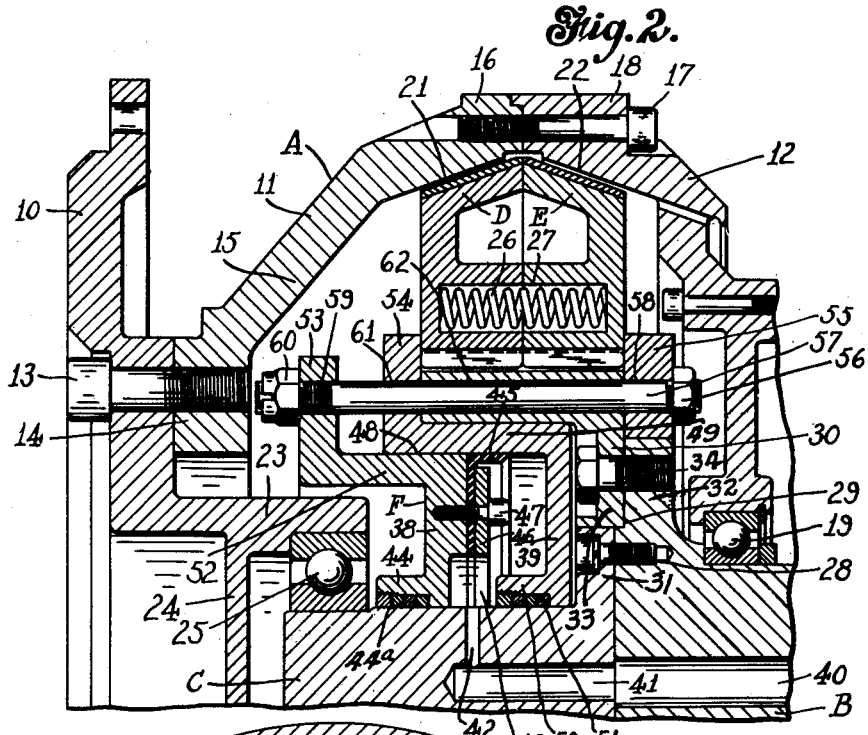
Fig. 2 is a view of the upper portion of Fig. 1, showing the clutch in the disengaged position.
Figure 3:
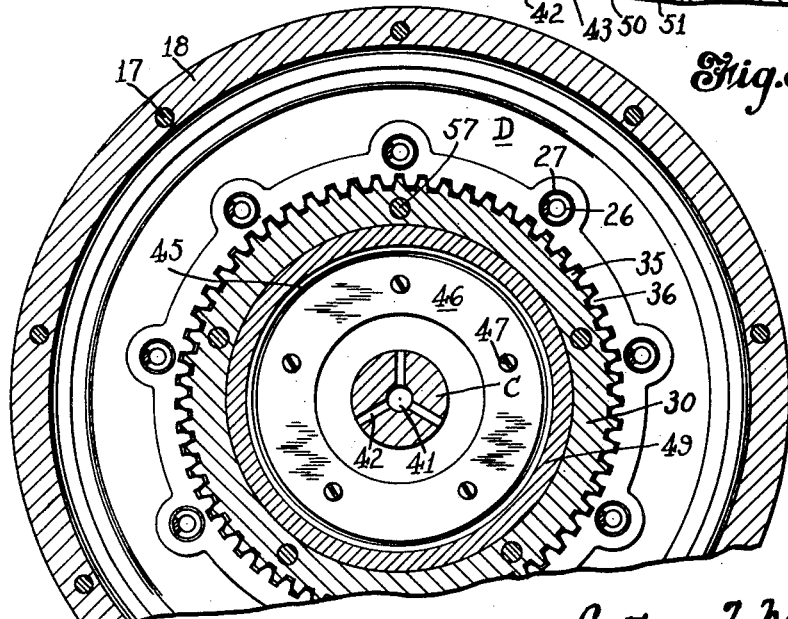
Fig. 3 is a section on line 3—3 of Fig. 1.

It is believed that the manner of operating the clutch will be clear from the foregoing description. The pressure fluid being admitted to the space between the pressure members 38 and 39, the member 39 is thrust to the right with reference to Fig. 1, and the member 38 is thrust to the left for the purpose of drawing toward each other the clutch sections D and E, and thereby removing them from engagement with the inner surface of the engine-driven member. The disengaged position is shown in Fig. 2, and it will be noted that in this position the clutch sections may be limited in their movement by coming into contact with each other, as shown in Fig. 2, although other provisions may be made if desired for limiting the movement of the sections. The sections in moving are guided by their splines which co-act with the splines of the ring 30, the latter member being a part of the hub structure provided upon the shaft. When the sections are in the engaged position, the drive of the shaft is through the member 30 and the hub portion secured to this member. In this construction there are two axially movable pressure members arranged radially inwardly of the splined ring, and these members move oppositely, one sliding upon the other, and both having lateral flanges located forwardly of the clutch sections, one of said flanges acting directly on the forward clutch section and the other flange operating on the other clutch section through the tie rods or like members and the pressure ring 55. In this construction also the hub-like structure provided upon the shaft and including the splined member 30 provides an annular chambered portion located forwardly of the hub, in which the pressure member 39 is received, the pressure member 38 in turn being received in the pressure member 39, and both pressure members being guided partly by the forward end of the shaft and partly by the splined member 30.

Figure 4:
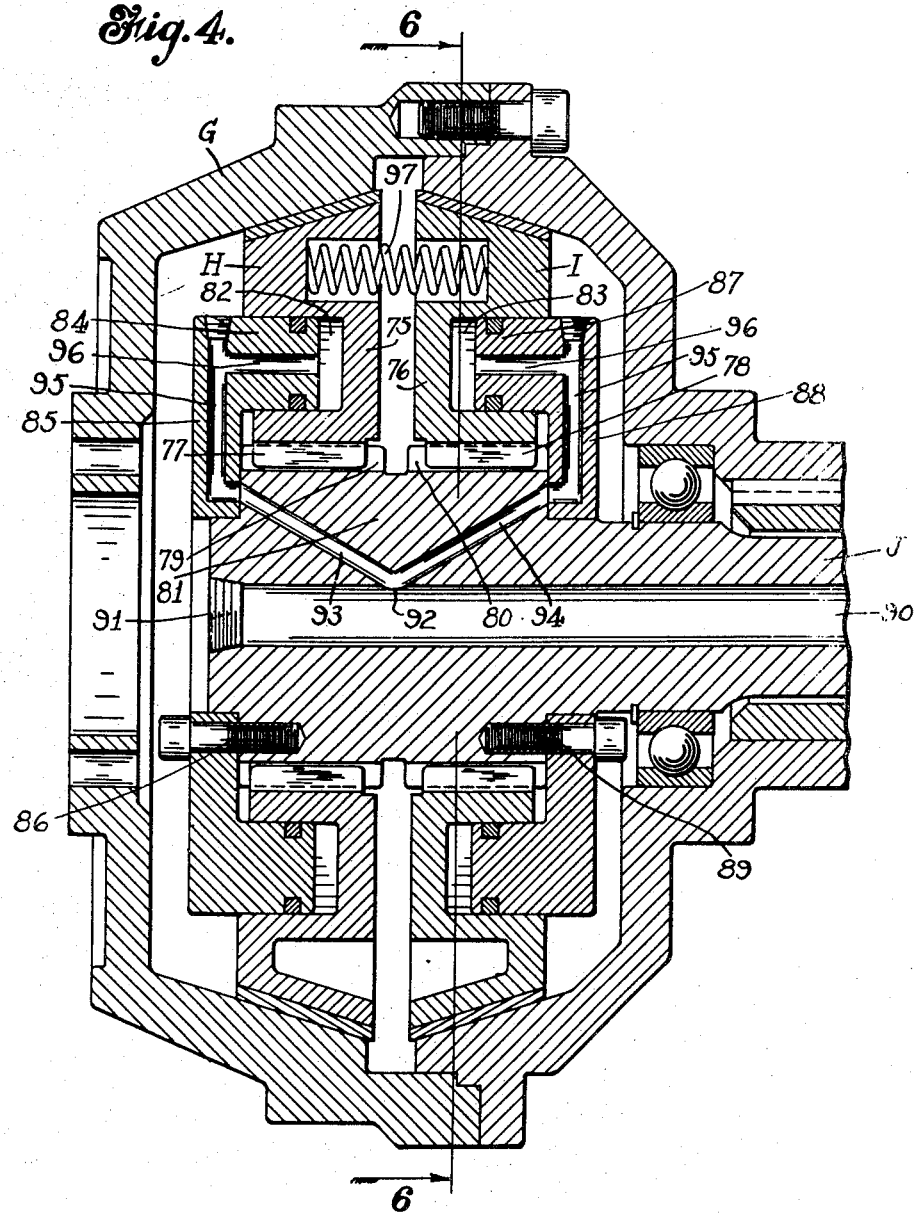
Fig. 4 is a sectional view similar to Fig. 1, showing a modified form of clutch, the clutch being in the engaged position.
Figure 5:
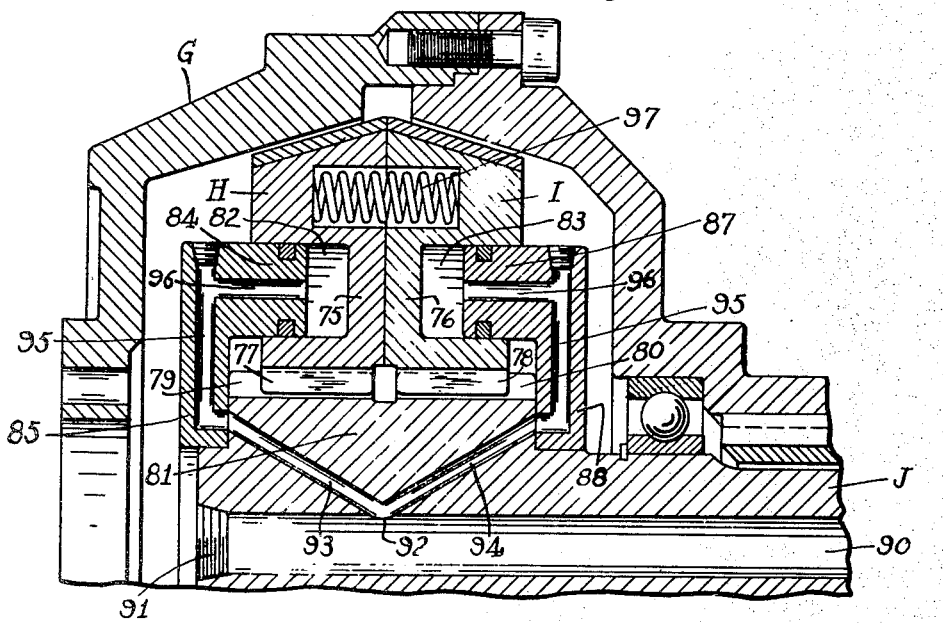
Fig. 5 is a sectional view showing the upper portion of the device of Fig. 4, the clutch being in the disengaged position.
Figure 6:
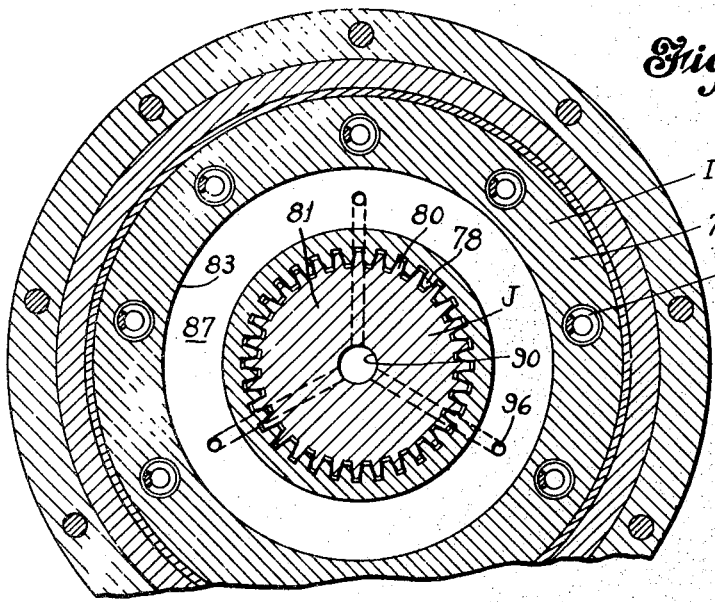
Fig. 6 is a section on line 6—6 of Fig. 4.

In the modified form shown in Figs. 4, 5 and 6, an engine-driven member G is employed which is generally similar to that previously described, and the inner member of the clutch comprises the sections H and I. These sections, in the position shown in Fig. 4, are in engagement with the engine-driven member and connect said member to the forward end of a shaft J. In this structure the pressure members are formed upon radially inward portions or extensions of the sections H and I. These sections are of annular form and provided with inwardly extending portions 75 and 76, respectively, and upon the radially inner surfaces of the extensions are splines 77 and 78, respectively, engaging splines 79 and 80, respectively, formed directly upon the periphery of a hub 81, which in this instance is integral with the shaft J. In their extensions 75 and 76 the sections are provided with annular grooves or recesses 82 and 83 facing respectively forwardly and rearwardly, and these recessed portions of the sections, in connection with fixed parts carried by the shaft and projecting into the recesses, are adapted to provide expansible fluid chambers. Projecting into the recess 82 is an annular piston-like portion 84 projecting from a member 85 in the nature of a disk fixed to the forward end of the shaft by means such as bolts 86. The part 84 is provided with suitable packing, as shown. The disk-like body portion of the member 85 is located forwardly of the splines of section H. The recess in section I is engaged by the projecting portion 87 of a disk-like member 88 held in fixed position on the shaft by means such as bolts 89.

The shaft is provided with a longitudinal interior passage 90 closed off at the forward end of the shaft by a plug 91, and provided intermediate of the ends of the hub portion 81 with a port 92 communicating, by way of slanting bores 93, 94 in the hub, with internal passages in the members 85 and 88. Inasmuch as these internal passages of the two members are identical, a description of one will suffice. Each of the members has a radial passage 95 communicating by a short branch with the corresponding passage 93 or 94. Intermediate the ends of the passage 95 a central longitudinal passage 96 leads through the piston-like part to the end face of the piston so as to enable fluid to reach the chamber in the clutch section. When fluid is admitted to the recesses or chambers, the inner members of the clutch are moved from the engaged position, shown in Fig. 4, to the disengaged position, shown in Fig. 5, against the action of springs 97 interposed between the sections. In this movement each of the clutch sections moves and is guided upon the fixed annular piston-like portion rigid with the shaft. The fluid acts directly against a transverse wall provided upon the radially inward part of the clutch section, in a manner to force the clutch section forwardly or rearwardly as the case may be. The described passages leading from the central passage 90 to the chambers in the clutch sections may advantageously be provided at three points in the circumference of the shaft, as shown in Fig. 6.

Figure 7:
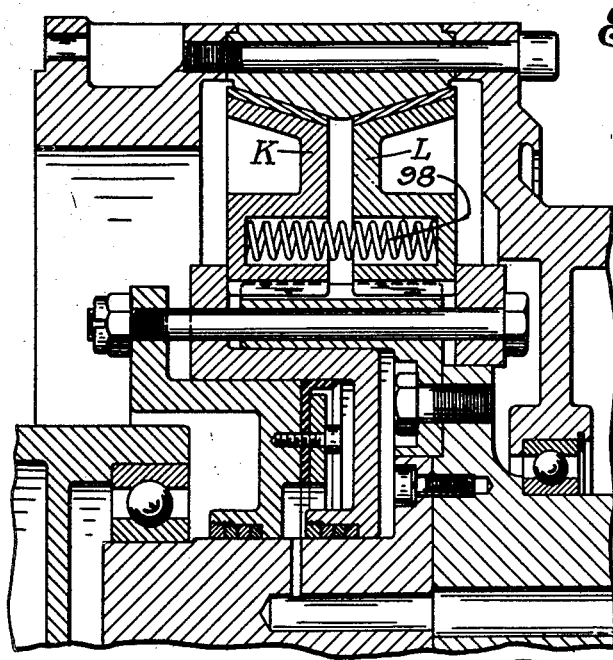
Fig. 7 is a sectional view showing a further modification.

Fig. 7 shows a modified form of the device which is similar to the device of Fig. 1, but has an arrangement in which the pressure fluid acts to engage the clutch against the action of springs which normally disengage it. Here the clutch sections are shown at K and L, these sections being separated by springs 98 that normally hold the clutch in the disengaged position. In this view the movable pressure members of the fluid-pressure device are in the position in which they hold the inner clutch members in contact with the outer member, the force exerted upon the member K being toward the right, and the force exerted upon member L being toward the left. In order to permit this, the inclination of the respective friction surfaces is opposite from that shown in Fig. 1.

One of the marked advantages of the present invention is that the clutch structure is simple and compact, involving a minimum number of rotating parts employed for the purpose of actuating the clutch, or, in other words, shifting it between the engaged and disengaged positions. The clutch as a whole, moreover, embodies a minimum number of parts. Moreover, the fluid-pressure means for actuating the clutch has an improved arrangement and improved structure. The fluid connections to the fluid-pressure device are especially advantageous, being simple and direct. Sealing means is provided for preventing leakage from the actuating device proper, and in the present case the structure is such that no particular problem is presented in this connection, the sealing provisions being simple and entirely adequate. In connection with the supply of fluid from a fixed pipe to the rotating shaft, sealing means between the shaft and the fixed pipe is required, but this sealing means can be of simple and durable character. Moreover, a sealing device such as shown by way of example in Fig. 8 has the advantage that in a reverse gear it can have a location adjacent the rear end of the driving shaft, where it is readily accessible if any trouble is encountered. Other forms of sealing devices which are satisfactory for the purpose can obviously be used in connection with the shaft. It is to be understood that, while in some cases the introduction of fluid into the rear end of the shaft is of importance, there are other cases in which different arrangements for supplying fluid to the pressure device are contemplated.

While several forms of the invention are illustrated, it will be apparent that many modifications and detail changes may be made without departing from the principles of the invention or the scope of the claims.

What we claim is:

1. In clutch mechanism, the combination of an outer member having inner oppositely inclined conical friction surfaces, a shaft having an end portion radially inwardly of said outer member and provided with an interior fluid passage leading toward the extremity of the shaft and laterally in the shaft to the exterior thereof, an inner clutch member for connecting the outer member to the shaft having axially movable sections adapted to engage the clutch by movement in a separating direction to make contact with said friction surfaces and to disengage the clutch by movement in an approaching direction, spring means for moving said sections in the clutch-engaging direction, and fluid-pressure means in communication with said passage for moving said sections in the other direction comprising rigid pressure wall members connected to said sections.

2. In clutch mechanism, the combination of an outer member having inner oppositely inclined conical friction surfaces, a shaft having an end portion radially inwardly of said outer member, an inner clutch member for connecting the outer member to the shaft having axially movable sections in splined relationship to the shaft arranged in close proximity and adapted to cooperate with said friction surfaces, spring means interposed between said sections and acting upon them normally to move them away from each other and engage the clutch, and fluid-pressure means comprising rigid pressure wall members acting upon the respective sections to move them toward each other and thereby disengage the clutch.

3. In clutch mechanism, the combination of an outer member having inner oppositely inclined conical friction surfaces, a shaft having an end portion radially inwardly of said outer member, an inner clutch member for connecting the outer member to the shaft having axially movable sections arranged in close proximity and adapted to cooperate with said friction surfaces, spring means interposed between said sections and acting upon them normally to move them away from each other and engage the clutch, and fluid-pressure means comprising rigid pressure wall members acting upon the respective sections to move them toward each other and thereby disengage the clutch, one of said wall members acting on one of the sections to push it in a forward direction and the other acting on the other section to push it in a rearward direction.

4. In clutch mechanism, the combination of an outer member having inner oppositely inclined conical friction surfaces, a shaft having an end portion radially inwardly of said outer member, an inner clutch member for connecting the outer member to the shaft having axially movable sections arranged in close proximity and adapted to cooperate with said friction surfaces, spring means interposed between said sections and acting upon them normally to move them away from each other and engage the clutch, and fluid-pressure means comprising rigid pressure wall members acting upon the respective sections to move them toward each other and thereby disengage the clutch, one of said wall members acting on one of the sections to push it in a forward direction and the other acting on the other section to push it in a rearward direction, said wall members being acted upon by pressure fluid passing through a lateral supply passage in the shaft.

5. In clutch mechanism, the combination of an outer member having inner oppositely inclined conical friction surfaces, a shaft having an end portion radially inwardly of said outer member, an inner clutch member for connecting the outer member to the shaft having axially movable sections arranged in close proximity and adapted to cooperate with said friction surfaces, spring means interposed between said sections and acting upon them normally to move them away from each other and engage the clutch, and fluid-pressure means comprising rigid pressure wall members acting upon the respective sections to move them toward each other and thereby disengage the clutch, one of said wall members acting on one of the sections to push it in a forward direction and the other acting on the other section to push it in a rearward direction, said wall members being acted upon by pressure fluid passing through a lateral supply passage in the shaft, said wall members being moved oppositely by pressure fluid introduced into a space between said members.

6. In clutch mechanism, the combination of an outer member having inner oppositely inclined conical friction surfaces, a shaft having an end portion radially inwardly of said outer member, an inner clutch member for connecting the outer member to the shaft having axially movable sections arranged in close proximity and adapted to cooperate with said friction surfaces, spring means interposed between said sections and acting upon them normally to move them away from each other and engage the clutch, and fluid-pressure means comprising rigid pressure wall members acting upon the respective sections to move them toward each other and thereby disengage the clutch, one of said wall members acting on one of the sections to push it in a forward direction and the other acting on the other section to push it in a rearward direction, said wall members being acted upon by pressure fluid passing through a lateral supply passage in the shaft, said wall members being moved oppositely by pressure fluid introduced into a space between said members and being guided in an axial direction by a portion of said shaft.

7. In clutch mechanism, the combination of an outer member having inner oppositely inclined conical friction surfaces, a shaft concentric with said member, an inner clutch member for connecting the outer member to the shaft having adjacent axially movable ring-like members adapted to be moved away from each other to engage said friction surfaces and to be moved toward each other to release the clutch, and pressure members axially movable between which fluid is introduced connected to the respective ring-like members for moving them to clutch-releasing position when fluid is introduced between said pressure members.

8. In clutch mechanism, the combination of an outer member having inner oppositely inclined conical friction surfaces, a shaft having an end portion radially inwardly of said outer member, an inner clutch member for connecting the outer member to the shaft having axially movable sections arranged in close proximity and adapted to cooperate with said friction surfaces, spring means interposed between said sections and acting upon them normally to move them away from each other and engage the clutch, fluid pressure means comprising members movable axially of the clutch between which fluid is introduced to move them in opposite directions, and means connecting said members with said inner clutch sections so that on separating movement of the members the clutch sections are moved toward each other.

9. In clutch mechanism, the combination of an outer member having inner oppositely inclined conical friction surfaces, a shaft having an end portion radially inwardly of said outer member, an inner clutch member for connecting the outer member to the shaft having axially movable sections arranged in close proximity and adapted to cooperate with said friction surfaces, spring means interposed between said sections and acting upon them normally to move them away from each other and engage the clutch, fluid pressure means comprising members movable axially of the clutch between which fluid is introduced to move them in opposite directions, and means connecting said members with said inner clutch sections so that on separating movement of the members the clutch sections are moved toward each other, said members being guided at their inner parts upon said shaft.

10. In clutch mechanism, the combination of an outer member having inner oppositely inclined conical friction surfaces, a shaft having an end portion radially inwardly of said outer member, an inner clutch member for connecting the outer member to the shaft having axially movable sections arranged in close proximity and adapted to cooperate with said friction surfaces, spring means interposed between said sections and acting upon them normally to move them away from each other and engage the clutch, fluid pressure means comprising members movable axially of the clutch between which fluid is introduced to move them in opposite directions, and means connecting said members with said inner clutch sections so that on separating movement of the members the clutch sections are moved toward each other, said members being guided at their inner parts upon said shaft, and being guided at their outer parts upon each other and upon a hub structure carried by the shaft.

11. In clutch mechanism, the combination of an outer member having inner oppositely inclined conical friction surfaces, a shaft having an end portion radially inwardly of said outer member, an inner clutch member for connecting the outer member to the shaft having axially movable sections arranged in close proximity and adapted to cooperate with said friction surfaces, spring means interposed between said sections and acting upon them normally to move them away from each other and engage the clutch, fluid-pressure wall members guided axially upon the shaft and between which fluid is introduced and each provided with a peripheral flange, said wall members telescoping so that one is guided upon the other, and the flanges of said members both being located forwardly of the clutch sections, one of said flanges being adapted to engage one clutch section to move it in a releasing direction, and means for connecting the other flange with the other clutch section so that the latter is moved in a releasing direction.

12. Clutch mechanism as defined in claim 11, in which the inner clutch sections are splined to a spline member forming part of a hub structure upon the shaft and in which the second-mentioned flange is connected to the second inner clutch section by means including a tie rod extending through said spline member.

13. In clutch mechanism, the combination of a shaft having a longitudinal fluid passage connected to the periphery of the shaft by a lateral fluid passage, pressure wall members guided along said shaft and having a chamber therebetween into which fluid is introduced from the latter passage, a hub structure fixed to the shaft adjacent said members and including a spline member having radially outer splines, inner cone-clutch sections having splines engaging said first splines and movable axially of the structure, an outer clutch member enclosing said sections and having inner cone surfaces to be engaged by the respective sections, springs separating said sections and tending to hold the sections in frictional engagement with the outer clutch member, said wall members having peripheral flanges located forwardly of said sections so that one flange is adapted to contact with and release the forward clutch section, and means for connecting the other flange with the rear clutch section so that on forward movement of the flange the second section is moved in the disengaging direction.

14. In clutch mechanism, the combination of a shaft having a hub portion and an inner fluid passage forwardly of the hub portion, wall members guided along the shaft and oppositely movable and adapted to receive between them fluid from the shaft passage for moving the rear member rearwardly and the forward member forwardly, inner clutch sections guided axially upon the hub portion, an outer clutch member with which said sections are normally held in contact by springs interposed between said sections, said wall members having peripheral portions located forwardly of said inner sections, one of which portions is adapted to carry the forward inner section rearwardly, and means connecting the peripheral portion of the other wall member with the rearward inner clutch section so that said section is moved forwardly when fluid is introduced between said wall members.

15. In clutch mechanism, the combination of a shaft, an inner double-cone friction-clutch member connected to the shaft, an outer double-cone friction-clutch member cooperating with said inner member, the inner member comprising sections spring pressed to separate them axially and thereby engage the outer clutch member, and fluid-pressure means comprising members between which fluid is introduced and which move away from each other under the action of the pressure fluid, said members when moving away from each other acting upon said clutch sections to move them toward each other to disengage the clutch.

16. In clutch mechanism, the combination of a shaft having a longitudinal fluid passage and having a hub portion, inner clutch sections splined to said hub portion and having respectively oppositely inclined friction surfaces, an outer clutch member having inner oppositely inclined friction surfaces adapted to be engaged by the first-mentioned surfaces, said clutch sections being adapted to be moved axially away from each other to engage the clutch and to be moved toward each other to disengage the clutch, springs interposed between said sections tending to separate them and engage the clutch, and fluid-pressure members including chambered extensions on said sections in communication with said shaft passage whereby said sections are moved toward each other by the pressure fluid to disengage the clutch.

17. In clutch mechanism, the combination of a shaft having a longitudinal fluid passage and having a hub portion, inner clutch sections splined to said hub portion and having respectively oppositely inclined friction surfaces, an outer clutch member having inner oppositely inclined friction surfaces adapted to be engaged by the first-mentioned surfaces, said clutch sections being adapted to be moved axially away from each other to engage the clutch and to be moved toward each other to disengage the clutch, springs interposed between said sections tending to separate them and engage the clutch, and fluid-pressure members including chambered extensions on said sections in communication with said shaft passage whereby said sections are moved toward each other by the pressure fluid to disengage the clutch, said fluid-pressure members also including fixed piston-like members carried by the shaft having passages to carry fluid from the shaft passage into the fluid chambers of the sections.

ARTHUR T. NABSTEDT.
JOHN O. BERNDTSON.

REFERENCES CITED

The following references are of record in the file of this patent:

UNITED STATES PATENTS

| Number | Name | Date |
|---|---|---|
| 848,380 | Lake | Mar. 26, 1907 |
| 1,475,020 | Mayer | Nov. 20, 1923 |
| 2,136,971 | Fleischel | Nov. 15, 1938 |
| 2,289,991 | Paxman | July 19, 1942 |
| 2,351,867 | Peterson et al. | June 20, 1944 |
| 2,422,159 | Wood | June 10, 1947 |
| 2,426,160 | Berndtson | Aug. 26, 1947 |

FOREIGN PATENTS

| Number | Country | Date |
|---|---|---|
| 487,959 | Germany | Dec. 17, 1929 |